Patented May 15, 1951

2,552,507

UNITED STATES PATENT OFFICE 2,552,507

PURIFICATION AND FRACTIONATION OF HEPARIN PREPARATIONS

Andrew Ellis O'Keeffe and James A. Shannon, Metuchen, N. J., assignors to E. R. Squibb & Sons, New York, N. Y., a corporation of New York No Drawing. Application May 24, 1949,
Serial No. 95,168

13 Claims. (Cl. 260—210)

This invention comprises: (I) the method of purifying heparin preparations, which essentially comprises intimately contacting an aqueous solution of an impure heparin preparation with a solution of a long-chain aliphatic amine in a substantially water-immiscible organic solvent, separating the organic-solvent phase, and recovering a purified heparin preparation therefrom; (II) the method of fractionating an inhomogeneous heparin preparation, which essentially comprises distributing the heparin preparation, by use of a long-chain aliphatic amine as a carrier, between a substantially water-immiscible organic solvent for the base and an aqueous buffer whose pH is such that the distribution coefficient is in the range of about 0.1 to about 10, preferably in the range of about 0.25 to about 4, and separately recovering the heparin fractions; and (III) a substantially-homogeneous heparin, obtained by fractionation of an inhomogeneous heparin preparation, and having an activity of the order of 200–230 international units/mg. or higher. [The term "distribution coefficient" means, of course, the ratio of the concentration of the mixture of heparins in the organic solvent to the concentration thereof in the aqueous buffer.]

Heparin preparations have been purified heretofore, but the purification methods available were in general complex and/or inefficient; and, although it was recognized heretofore that heparin preparations (even the most highly purified preparations obtained in the laboratory) were inhomogeneous, a substantially - homogeneous heparin had not been obtained. This invention provides a simple and efficient method of purifying heparin preparations, and a related, simple and efficient method of fractionating inhomogeneous heparin preparations, the latter enabling provision of a substantially-homogeneous highly-active heparin.

Method I may be applied to impure heparin preparations of various grades of purity. Thus, it may be applied to the filtrate (a crude heparin solution) obtained by autolysis of liver or lung tissue, extraction with alkali, and filtration; to a heparin preparation suitable for medicinal use, obtained from such crude product by further purification (cf. J. Biol. Chem. 148, 641, 1943); or to a heparin preparation of an intermediate grade of purity.

Method II may be applied to any of the aforementioned heparin preparations. Preferably, however, it is applied to an at least partially purified heparin preparation, e. g., to a (commercial) heparin preparation suitable for medicinal use, or to a crude or commercial heparin preparation which has been (or is being) purified by method I.

The heparin in the preparation to be purified or fractionated may be in the form of the free acid or water-soluble salt, especially alkali-metal (including ammonium) or alkaline-earth-metal salt. The utilizable long-chain aliphatic amines (chains of more than six carbon atoms) include, inter alia, stearyl - dimethyl - amine, n - octylamine, methyl-dioctylamine, ethyl-octylamine, ethyl-nonylamine, and (notably) n-dodecylamine.

The utilizable substantially water-immiscible organic solvents include, inter alia: aliphatic alcohols, such as n-amyl (1-pentanol), n-butanol (1-butanol), sec. butanol, methyl-isobutyl-carbinol, methyl-amyl-carbinol, methyl-isopropyl-carbinol, isobutyl-carbinol, 2-ethyl-hexanol, and amyl alcohol mixtures, such as refined fermentation-amyl-alcohol; aliphatic alcohol esters of lower fatty acids, such as the acetate of methyl-isobutyl-carbinol, and amyl acetate; aliphatic ketones, such as methyl-isobutyl ketone; aliphatic ethers, such as di-n-butyl ether, and diethyl ether; hydrocarbons, such as benzene and toluene; and halogenated hydrocarbons, such as ethylene dichloride, chloroform, and carbon tetrachloride. Where the long-chain aliphatic amine is a liquid, as in the case of n-octylamine, it may perform the functions of both the carrier and organic solvent.

In method I, the purified heparin preparation may be recovered from the organic-solvent phase by re-extraction into an aqueous phase of a pH of the order of 8–12, preferably of the order of 11–12 (e. g., with water adjusted to that pH by addition of sodium hydroxide or with half-molar bibasic potassium or sodium phosphate), neutralizing the aqueous phase, dialyzing to remove salts, and drying (e. g., freeze-drying).

In method II, the aqueous buffer solution may be prepared with conventional buffers or buffer combinations, e. g., dibasic potassium phosphate and boric acid adjusted to pH 6.5 while in intimate contact with the organic solvent phase. The pH range in which a particular buffer or buffer combination is utilizable is readily ascertainable, by determining the distribution coefficient of the heparin preparation at several different pH levels, and (by interpolation) selecting the range at which the heparin activity is approximately equally divided between the two phases. Thus, the following distribution coefficients (D) were found at the indicated pH's for commercial heparin in the system [2.5% laurylamine in mixed synthetic amyl alcohols (pentasol)] vs. [0.45 M $K_2HPO_4$ and 0.05 M $H_3BO_3$]:

| D | pH |
|---|---|
| 1.76 | 6.5 |
| 1.41 | 6.8 |
| 1.62 | 7.0 |
| 1.4 | 7.0 |
| .30 | 7.3 |
| 0 | 7.5 |
| 13.3 | 8.0 |
| 13.1 | 8.2 |
| 2.05 | 8.3 |
| 1.51 | 8.4 |
| 0 | 8.5 |

The pH of 6.5 selected in Example 2 hereinafter is within the utilizable range thus ascertained.

In method II, the portion of organic-solvent phase having the highest activity (E. g., the contents of the peak and adjacent tubes obtained on Craig countercurrent distribution, initially located by means of anthrone, which is specific for carbohydrates) is subjected to extraction with an aqueous phase of a pH of the order of 8-12, preferably of the order of 10-12; the aqueous phase is neutralized and dialyzed; and the substantially homogeneous heparin therein is separated by drying (e. g., by freeze-drying).

The organic solvent phase obtained in either method I or II contains a long-chain aliphatic amine salt of heparin; and if no substantial excess of the amine is used, such salt may be recovered by evaporation of the solvent. If the long-chain aliphatic amine component selected is pharmacologically-acceptable, the salt may advantageously be employed in a depot preparation for prolonged heparin action, e. g., dissolved or suspended in a vegetable oil and beeswax depot medium, or in a vegetable oil plus aluminum monostearate gel.

The following examples are illustrative of the invention:

Example 1

100 mg. of a commercial sodium heparin (having a potency of 110 international units/mg.) is dissolved in 500 ml. water; and the solution is intimately mixed with a solution of 2.5 g. n-dodecylamine in 100 ml. mixed synthetic amyl alcohols (e. g., pentasol). The amyl alcohol phase (containing about 90% of the heparin in the starting material) is separated from the aqueous phase, extracted twice with water at pH 11.5 (water adjusted by means of 10% sodium hydroxide); the (combined) aqueous extract is neutralized by addition of 10% hydrochloric acid; and the solution is dialyzed to remove salts, adjusted to the desired potency (e. g., 1000 international units/cc.), and ampuled (with the addition of a preservative, if desired).

The pH of the aqueous solution of sodium heparin treated is adjusted (if necessary) prior to treatment with the amyl alcohol solution of n-dodecylamine, extraction into the organic solvent phase taking place at all pH levels below about 10, most efficiently at pH levels of about 6-10, and notably at pH levels of 8.5-10. Also, the proportion of n-dodecylamine to units of heparin employed in the foregoing example may be varied, the n-dodecylamine carrier being demonstrably essential to the extraction into the organic solvent phase, but an excess of the carrier not interfering with the extraction. Obviously, however, the amount of carrier used should be the minimum required for efficient extraction, which amount is readily determinable for each heparin preparation treated.

Example 2

50 mg. of a commercial sodium heparin, having a potency of 110 international units/mg., is distributed between an aqueous and an organic solvent phase in a Craig countercurrent distribution apparatus of 25 tubes (cf. J. Biol. Chem., 155, 519, 1944), the aqueous phase being 0.45 molar in dibasic potassium phosphate and 0.05 molar in boric acid, and the organic solvent phase being a 2.5% solution of laurylamine in pentasol. The two phases are equilibrated with one another, and adjusted while in intimate contact to a pH of 6.5 by means of aqueous sulfuric acid, prior to introducing them into the Craig machine. On completion of the distribution, the organic-solvent-phase contents of the peak tube and adjacent tubes (the peak tube being initially located by means of anthrone, the test for carbohydrate substances disclosed in Science, vol. 107, 254, 1948) are combined and intimately contacted with an 0.5 molar dipotassium acid phosphate solution in water adjusted to pH 10 with 0.5 molar sodium hydroxide. The aqueous phase is then separated and combined with the aqueous phase contents of the same peak and adjacent tubes; and the combined aqueous solution is neutralized with 10% hydrochloric acid, dialyzed to remove salts, and freeze-dried.

The product, a substantially-homogeneous heparin, gives the following analysis [the analysis of the other major heparin fraction formed on distribution (similarly-recovered from the organic-solvent-phase of the anthrone-located tubes) being given for comparison]:

|  | High Activity Fraction | Other Fraction |
|---|---|---|
| Ash (sulfated) | 33.88 | [1] 23.39 |
| Potassium | 15.19 | [2] 10.46 |
| Nitrogen | 2.03 | 3.33 |
| Sulfur | 13.33 | 8.42 |
| S/N Ratio | 1.98 | 1.1 |
| K/S Ratio | 0.93 | 1.02 |
| Activity | 215±17 | [3] 59±10 |

[1] All analytical figures are calculated to the dry basis.
[2] Calculated from ash.
[3] Activity is expressed in international units per mg.

Example 3

100 mg. of a commercial sodium heparin (having a potency of 110 international units/mg.) is dissolved in 500 ml. water; and the solution is intimately mixed with a solution of 4.0 g. stearyl dimethylamine in 100 ml. pentasol, the phases being adjusted while in intimate contact to a pH of 7.0 by means of aqueous hydrochloric acid. The amyl alcohol phase is separated from the aqueous phase (containing less than 1.66 units/ml.), and the heparin therein recovered as described in Example 1.

On adjustment to pH 6.0 or pH 4.0, instead of pH 7.0, the separated aqueous phases respectively contain about 6.25 and about 2.5 units/ml.

Example 4

A crude heparin solution obtained by autolysis of beef-lung tissue, extraction with alkali, and filtration is extracted with one-fourth its volume of a 2.5% solution of n-dodecylamine in pentasol at a pH of 8.5; the amyl alcohol phase is separated, extracted with water at pH 11.5 (NaOH), and then washed with water; and the combined aqueous extract and wash is washed with hexane, neutralized (e. g., with an ion-exchange resin, such as IR 100, hydrogen cycle), and freeze-dried. The crude heparin thus obtained has a potency of about 2.4 units/mg., the yield being about 114 units per pound lung tissue.

On adjustment to pH 9.0 instead of 8.5, the crude heparin obtained has a potency of about 3.1 units/mg., and the yield is about 342 units per pound lung tissue.

The crude heparins thus obtained may be further purified (by conventional procedures, or by the methods of the invention) to obtain a heparin preparation suitable for medicinal use.

The extractions and distributions described hereinbefore may, of course, be adapted to large-scale operation, using conventional large-scale apparatus and technique, e. g., countercurrent-distribution apparatus, centrifuges, funnels and columns.

The invention may be variously otherwise embodied within the scope of the appended claims.

We claim:

1. The method of purifying heparin preparations, which essentially comprises intimately contacting an aqueous solution of an impure heparin preparation with a solution of a long-chain aliphatic amine in a substantially water-immiscible organic solvent, separating the organic-solvent phase, and recovering a purified heparin preparation therefrom.

2. The method of fractionating an inhomogeneous heparin preparation, which essentially comprises distributing the heparin preparation, by use of a long-chain aliphatic amine as a carrier, between a substantially water-immiscible organic solvent for the base and an aqueous buffer whose pH is such that the distribution coefficient is in the range of about 0.1 to about 10, and separately recovering the heparin fractions.

3. The method of purifying heparin preparations, which essentially comprises intimately contacting an aqueous solution of an impure heparin preparation with a solution of a long-chain aliphatic amine in a substantially water-immiscible organic solvent, separating the organic-solvent phase, and re-extracting the heparin therein into an aqueous phase of a pH of the order of 8–12.

4. The method of purifying heparin preparations, which essentially comprises intimately contacting an aqueous solution of an impure heparin preparation with a solution of a long-chain aliphatic amine in a substantially water-immiscible organic solvent, separating the organic-solvent phase, re-extracting the heparin therein into an aqueous phase of a pH of the order of 8–12, neutralizing the extract, dialyzing, and drying.

5. The method of purifying heparin preparations, which essentially comprises intimately contacting an aqueous solution of an impure heparin preparation with a solution of a long-chain aliphatic amine in a substantially water-immiscible organic solvent, separating the organic-solvent phase, and re-extracting the heparin therein into an aqueous phase of a pH of the order of 11–12

6. The method of purifying heparin preparations, which essentially comprises intimately contacting an aqueous solution of an impure heparin preparation with a solution of n-dodecylamine in a substantially water-immiscible organic solvent, separating the organic-solvent phase, and recovering a purified heparin preparation therefrom.

7. The method of purifying heparin preparations, which essentially comprises intimately contacting an aqueous solution of an impure heparin preparation with a solution of stearyl dimethylamine in a substantially water-immiscible organic solvent, separating the organic-solvent phase, and recovering a purified heparin preparation therefrom.

8. The method of fractionating an inhomogeneous heparin preparation, which essentially comprises distributing the heparin preparation, by use of a long-chain aliphatic amine as a carrier, between a substantially water-immiscible organic solvent for the base and an aqueous buffer whose pH is such that the distribution coefficient is in the range of about 0.25 to about 4, and separately recovering the heparin fractions.

9. The method of fractionating an inhomogeneous heparin preparation, which essentially comprises distributing the heparin preparation, by use of a long-chain aliphatic amine as a carrier, between a substantially water-immiscible organic solvent for the base and an aqueous buffer whose pH is such that the distribution coefficient is in the range of about 0.1 to about 10, recovering the portion of the organic-solvent phase having the highest activity, and extracting the heparin from the latter into an aqueous phase of a pH of the order of 8–12.

10. The method of fractionating an inhomogeneous heparin preparation, which essentially comprises distributing the heparin preparation between an aqueous and organic solvent phase in a series of stages, the solvent phase being a solution of a long-chain aliphatic amine in a substantially water-immiscible organic solvent, and the aqueous phase being a buffer solution whose pH is such that the distribution coefficient is in the range of about 0.1 to about 10, and recovering the organic solvent phase formed at the stage of highest heparin activity.

11. The method of fractionating an inhomogeneous heparin preparation, which essentially comprises distributing the heparin preparation between an aqueous and organic solvent phase in a series of stages, the solvent phase being a solution of n-dodecylamine in a substantially water-immiscible organic solvent, and the aqueous phase being a buffer solution whose pH is about 6.5, and recovering the organic solvent phase formed at the stage of highest heparin activity.

12. The method of fractionating an inhomogeneous heparin preparation, which essentially comprises distributing the heparin preparation between an aqueous and organic solvent phase in a series of stages, the solvent phase being a solution of a long-chain aliphatic amine in a substantially water-immiscible organic solvent, and the aqueous phase being a buffer solution whose pH is such that the distribution coefficient is in the range of about 0.1 to about 10, recovering the organic solvent phase formed at the stage of highest heparin activity, extracting the heparin from the latter into an aqueous phase of a pH of the order of 8–12, and recovering the heparin from the latter aqueous phase and from the aqueous phase formed at the stage of highest heparin activity.

13. A substantially-homogeneous heparin, obtained by fractionation of an inhomogeneous heparin preparation, by the method defined by claim 10 and having an activity of about 215 international units/mg.

ANDREW ELLIS O'KEEFFE.
JAMES A. SHANNON.

REFERENCES CITED

The following references are of record in the file of this patent:

UNITED STATES PATENTS

| Number | Name | Date |
|---|---|---|
| 2,377,016 | Kuizenga | May 29, 1945 |

OTHER REFERENCES

Scott et al., Trans. Roy Soc. Canada, sec. V, 1942, p. 49–51, 3 pages.